United States Patent
Meredith et al.

(10) Patent No.: US 9,538,441 B2
(45) Date of Patent: Jan. 3, 2017

(54) SYSTEM AND METHOD FOR OFFLOAD OF WIRELESS NETWORK

(71) Applicants: AT&T Intellectual Property I, L.P., Atlanta, GA (US); AT&T Mobility II LLC, Atlanta, GA (US)

(72) Inventors: Sheldon Kent Meredith, Roswell, GA (US); Adam Gasper, Roswell, GA (US); Mark Austin, Roswell, GA (US); Rick Tipton, Corryton, TN (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 76 days.

(21) Appl. No.: 14/575,315

(22) Filed: Dec. 18, 2014

(65) Prior Publication Data

US 2016/0183139 A1    Jun. 23, 2016

(51) Int. Cl.
*H04W 8/02* (2009.01)
*H04W 36/14* (2009.01)
*H04W 8/18* (2009.01)

(52) U.S. Cl.
CPC ............. *H04W 36/14* (2013.01); *H04W 8/18* (2013.01)

(58) Field of Classification Search
CPC ....................................................... H04W 8/02
USPC ........................................... 455/432.1, 432.3
See application file for complete search history.

(56) References Cited

U.S. PATENT DOCUMENTS

| | | | |
|---|---|---|---|
| 7,292,870 B2 | 11/2007 | Heredia et al. | |
| 7,929,964 B2 | 4/2011 | Arumi et al. | |
| 8,116,223 B2 | 2/2012 | Tian et al. | |
| 8,385,895 B2 * | 2/2013 | Rahman | H04W 4/02 455/414.3 |
| 8,570,993 B2 | 10/2013 | Austin et al. | |
| 8,590,023 B2 | 11/2013 | Gupta et al. | |

(Continued)

FOREIGN PATENT DOCUMENTS

| | | |
|---|---|---|
| CA | 2781324 A1 | 1/2013 |
| WO | 2013128071 | 9/2013 |

OTHER PUBLICATIONS

Apple Online support, "iOS Wi-Fi profiles: About Auto Join and per-connection password settings," downloaded from http://supportapple.com/kb/HT4989, Oct. 8, 2014, 3 pages.

(Continued)

*Primary Examiner* — Christopher M Brandt
(74) *Attorney, Agent, or Firm* — Zagorin Cave LLP

(57) ABSTRACT

A method of managing network resource usage of a mobile communications device includes initiating registration of the mobile communications device with a wireless wide area communications network. The method includes receiving a region indicator from the wireless wide area communications network in response to the initiating. The method includes selectively communicating by the mobile communications device with a second communications network according to a rules profile associated with the region indicator. The region indicator may be a country code or network code. The rules profile may be one of a plurality of rules profiles identified based on the region indicator. Individual rules profiles of the plurality of rules profiles specify at least one of time of day constraints, access point identifier constraints, and performance threshold constraints.

18 Claims, 5 Drawing Sheets

(56) References Cited

U.S. PATENT DOCUMENTS

| | | |
|---|---|---|
| 8,621,590 B2 | 12/2013 | Hoggan |
| 8,687,547 B2 | 4/2014 | Collingrige |
| 8,750,265 B2 | 6/2014 | Scherzer et al. |
| 8,787,936 B2 | 7/2014 | Tibbitts et al. |
| 2005/0113088 A1* | 5/2005 | Zinn ............... H04W 8/183 455/435.2 |
| 2005/0249171 A1* | 11/2005 | Buckley ............ H04W 48/16 370/338 |
| 2006/0133317 A1* | 6/2006 | Hurtta ............... H04W 8/20 370/331 |
| 2006/0294245 A1 | 12/2006 | Raguparan et al. |
| 2008/0181179 A1* | 7/2008 | Karaoguz ........... H04W 8/20 370/331 |
| 2008/0275839 A1* | 11/2008 | Zabawskyj ........... H04W 4/02 |
| 2009/0124284 A1 | 5/2009 | Scherzer et al. |
| 2011/0039518 A1* | 2/2011 | Maria ............... H04L 12/66 455/406 |
| 2011/0280233 A1 | 11/2011 | Choi et al. |
| 2011/0294472 A1* | 12/2011 | Bramwell ........... H04W 8/04 455/413 |
| 2013/0058274 A1 | 3/2013 | Scherzer et al. |
| 2013/0100855 A1 | 4/2013 | Jung et al. |
| 2013/0137402 A1 | 5/2013 | Ergen |
| 2013/0231088 A1 | 9/2013 | Jabara et al. |
| 2013/0322401 A1 | 12/2013 | Visuri et al. |
| 2014/0004854 A1 | 1/2014 | Veran et al. |
| 2014/0113595 A1 | 4/2014 | Choi et al. |
| 2014/0140332 A1 | 5/2014 | Jung et al. |
| 2014/0237250 A1 | 8/2014 | Menezes et al. |
| 2014/0293829 A1 | 10/2014 | Visuri et al. |
| 2015/0350869 A1* | 12/2015 | Karshenas Najafabadi et al. ............... H04W 8/02 455/432.1 |

OTHER PUBLICATIONS

Optimum WiFi, "What is automatic sign in?" downloaded from http://preview.optimum.net/WiFi/Authentication/Intro, Oct. 8, 2014, 1 page.

Khan, Muhammad Jahanzaib, "Managing Wireless Security in an Organization," International Journal of Scientific & Technology Research, vol. 1, Issue 11, Dec. 2012, pp. 1-4.

Sakib, A.K.M., et al., "Key Agreement & Authentication Protocol for IEEE 802.11," Global Journal of Computer Science and Technology, vol. 11, Issue 20, Dec. 2011, pp. 7 pages.

Sobh, T., "Wi-Fi Networks Security and Accessing Control," I.J. Computer Network and Information Security, 2013, pp. 9-20.

Winter, S. et al., "Deliverable DJ5.1.5,3: Inter-NREN Roaming Infrastructure and Service Support Cookbook—Third Edition," Geant2, Information Society and Media, Oct. 29, 2008, 117 pages.

4G Americas, "Integration of Cellular and Wi-Fi Networks," white paper, Sep. 2013, pp. 1-65.

* cited by examiner

SYSTEM AND METHOD FOR OFFLOAD OF WIRELESS NETWORK

BACKGROUND

1. Field of the Invention

The present disclosure relates to mobile communications and more particularly to managing network usage by mobile communications devices.

2. Description of the Related Art

Mobile communications devices such as cellular telephones, smartphones, laptops, tablets, gaming systems, wearable devices, or other portable electronic communications equipment may be configured for communications using a first communications protocol (e.g., a protocol used by a wide area network) for voice and data communications. Although network coverage by a service provider in a particular region (e.g., the United States) may be ubiquitous and domestic roaming charges may be low, when the mobile communications device enters another region (e.g., crosses an international boundary), the mobile communications device may incur international roaming charges and generate substantial expense for the service provider associated with the mobile communications device. Thus, improved techniques for providing international roaming service to a mobile communications device are desired.

SUMMARY OF EMBODIMENTS OF THE INVENTION

In at least one embodiment of the disclosure, a method of managing network resource usage by a mobile communications device includes initiating registration of the mobile communications device with a wireless wide area communications network. The method includes receiving a region indicator from the wireless wide area communications network in response to the initiating. The method includes selectively communicating by the mobile communications device with a second communications network according to a rules profile associated with the region indicator. The region indicator may be a country code or network code. The country code or network code may be different from a corresponding country code or network code of a service provider associated with the mobile communications device. The rules profile may be one of a plurality of rules profiles identified based on the region indicator. Individual rules profiles of the plurality of rules profiles specify at least one of time of day constraints, access point identifier constraints, and performance threshold constraints.

In at least one embodiment of the disclosure, an apparatus includes a mobile communications device. The mobile communications device includes a first radio configured to communicate with a wireless wide area communications network. The mobile communications device includes a second radio for communicating with a wireless local area communications network. The mobile communications device includes a controller configured to select one of the first radio and the second radio for wireless communications of the mobile communications device based on a rules profile associated with a region indicator received by the mobile communications device from the wireless wide area communications network. The region indicator may be a country code or network code. The country code or network code may be different from a country code or network code of a service provider associated with the mobile communications device. The mobile communications device may include a storage circuit configured to store the rules profile as one of a plurality of rules profiles accessible based on the region indicator. The apparatus may include a rules engine configured to provide the rules profile to the mobile communications device.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A technique offloads mobile device communications from a first network (e.g., a wide area network) using a first communications protocol to a second network (e.g., a local area network coupled to the Internet) using a second communications protocol. The first network may be a satellite or terrestrial wide area network configured compliant with a first communications protocol, e.g., Long-Term Evolution (LTE), second-Generation (2G), third-Generation (3G), fourth-generation (4G), LTE-Advanced, LTE in unlicensed spectrum (LTE-U), Global System for Mobile Communications (GSM), Enhanced Data rates for GSM Evolution (EDGE), High Speed Packet Access (HSPA), Universal Mobile Telecommunications System (UMTS), and Worldwide Interoperability for Microwave Access (WiMax) wireless communications, or other wireless communications protocols, which use one or more of Code Division Multiple access (CDMA), Time Division Multiple Access (TDMA), Frequency Division Multiple Access (FDMA), Wideband CDMA (WCDMA), Orthogonal Frequency Division Multiple Access (OFDMA), or other suitable communications techniques. The second network may be a wireless local area network (LAN), personal area network (PAN), campus area network (CAN), metropolitan area network (MAN), implemented using a second communications protocol using Ethernet over twisted pair cabling, fiber-optic cabling, networks, and a local area network access point (e.g., access points compliant with a second communications protocol, e.g., protocols compliant with Institute of Electrical and Electronics Engineers (IEEE) 802.11 standards). The technique reduces expenses of a service provider associated with the mobile communications device due to roaming of the mobile communications device.

The local area wireless network may include one or more wireless access points (e.g., hot spots) that provide communications services to devices having a compatible radio within a home, within range of a business or other organization (e.g., airport, hotel, restaurant), within a particular city, within an academic campus, or within other suitable region. A wireless access point is a device that connects a mobile communications device to a wired local area network or wide area network that connects the mobile communications device to the Internet and delivers broadband communication services to the mobile communications device. A typical wireless access point connects to a router via a wired network as a standalone device, but may be integrated into the router itself. Range of the wireless access point may vary depending on the particular protocol (e.g., frequency band, radio output power, antenna gain, antenna type, and other system factors).

Figure 1:
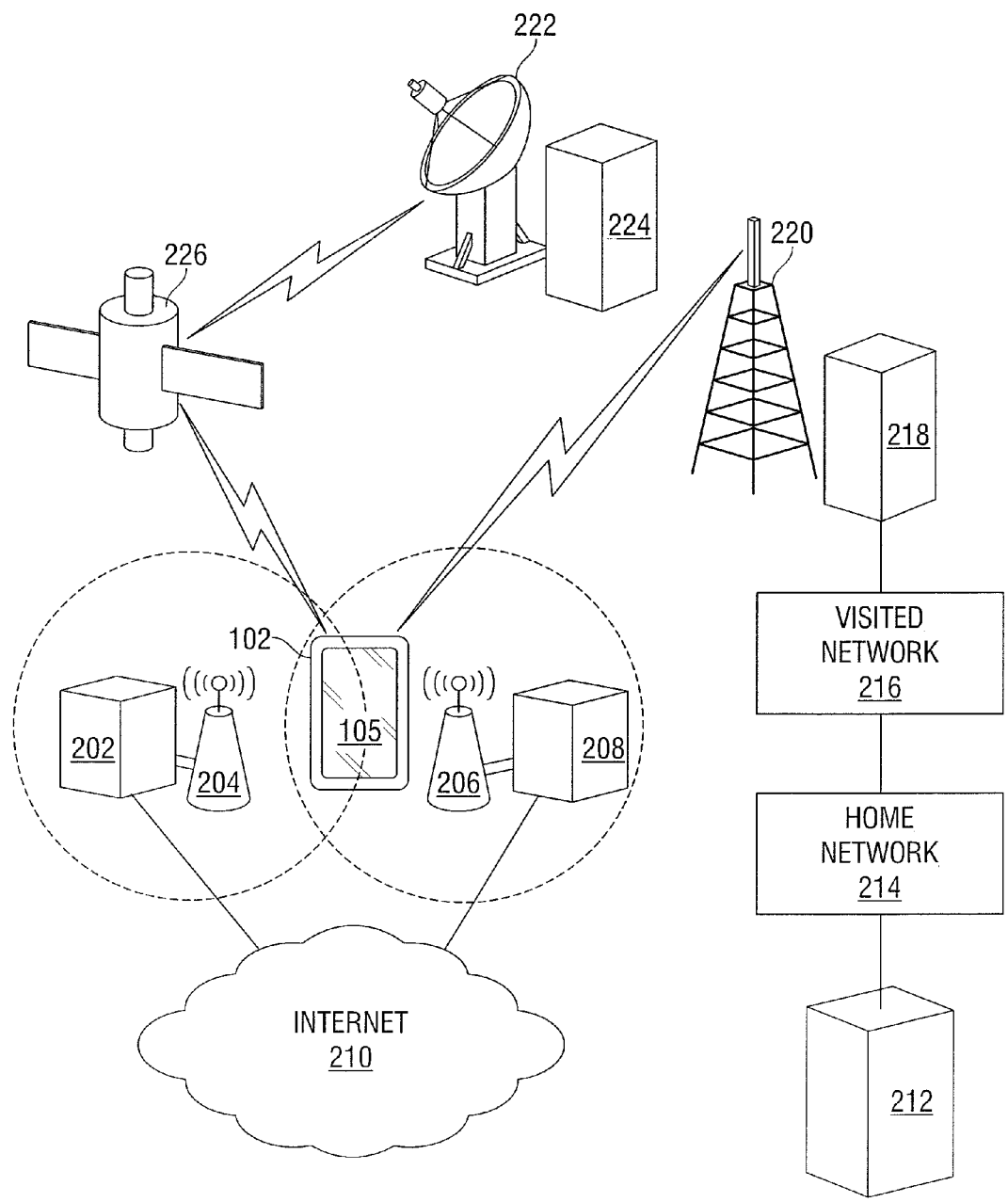
FIG. 1 illustrates a functional block diagram of an exemplary international telecommunications system.
Figures 2, 3:
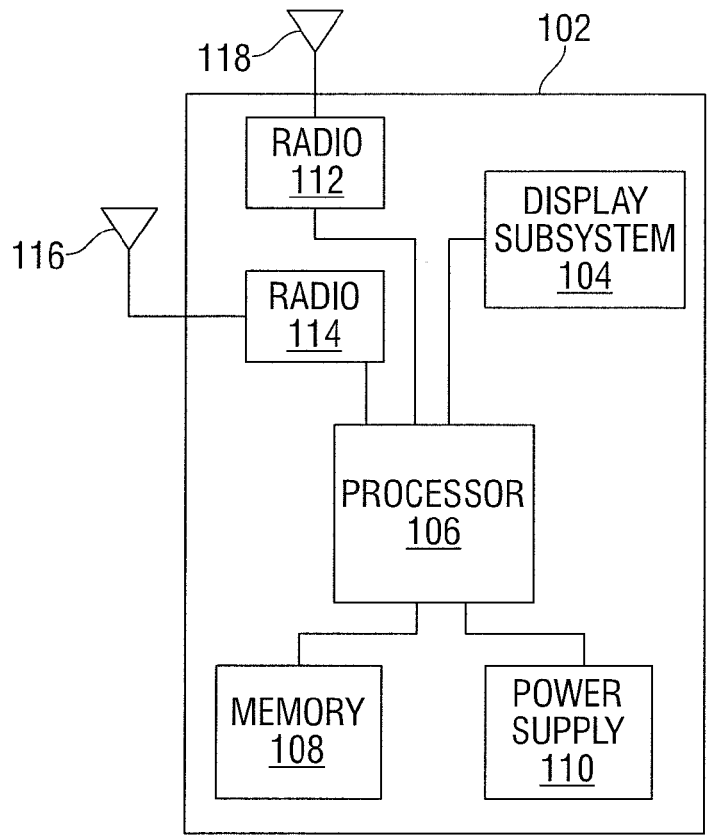
FIG. 2 illustrates a functional block diagram of an exemplary mobile communications device of FIG. 1.
FIG. 3 illustrates an exemplary configuration of rules profiles in memory of the mobile communications device of FIG. 2, consistent with at least one embodiment of the disclosure.

Referring to FIGS. 1 and 2, mobile communications device 102 includes offload controller 105, which may be implemented by an application specific circuit or processor 106 executing firmware or instructions stored in memory 108. Memory 108 may include one or more of random access memory, flash memory, read-only memory, erasable programmable read-only memories, electrically erasable programmable read-only memories, or other suitable storage elements. Offload controller 105 controls communications of mobile communications device 102 to offload communications based on region-specific rules profiles from a wide area network implemented using satellite 226 or cell tower 222 onto local area networks using implemented using access point 204 or access point 206 and associated elements. A network offload device application may be downloaded to the mobile communications device from a service provider after manufacture, e.g., from server equipment 212 and stored in memory 108, or functionality may be embedded in hardware, firmware, or other subsystem of the mobile communications device during manufacture. Offload controller 105 may perform intelligent selection of wireless network connections consistent with techniques described in U.S. patent application Ser. No. 12/883,145, entitled "Wi-Fi Intelligent Selection Engine," filed Sep. 15, 2010, naming Mark Austin, Kurt Huber, Sheldon Meredith, Michael A. Salmon, and Rick Tipton as inventors, now U.S. Pat. No. 8,570,993, which application is hereby incorporated by reference herein.

Referring to FIGS. 1 and 2, an exemplary mobile communications device 102 includes multiple radios for communications with the different radio access networks (e.g., satellite network, terrestrial wide area network, and wireless local area networks) and/or using different radio access protocols. For example, mobile communications device 102 includes radio 112 configured as part of a transceiver that communicates with a terrestrial wide area network communications system including cell tower 220 and base station 218 and/or a satellite wide area network communications system including a non-terrestrial relay (e.g., satellite 226) and a terrestrial satellite band receiver 222, which is coupled to equipment 224 that couples mobile communications device 102 to the Internet and/or telephony system. A user of mobile communications device 102 is associated with home network 214 by a service contract with a service provider that operates home network 214.

An exemplary wide area network includes a plurality of elements (e.g., mobility management entity, serving gateway, packet data network gateway, etc.) that host logic for performing tasks on a network (e.g., home network 214 or visited network 216). The logic can be hosted on servers. In modern packet-based wide area networks, the servers (e.g., billing servers, application servers, etc.) may be placed at several logical points on the network. Those servers may be in communication with databases and can enable communication devices to access the contents of a database. A typical server may include several network elements, including other servers, and can be logically situated anywhere on a service provider's network, e.g., the back-end of a cellular network. Home network server 214 hosts or is in communication with a database hosting an account for the user of the mobile communications device. A typical user account includes several attributes for that particular user, including a unique identifier of the mobile communications device(s) owned by the user, relationships with other users, application usage, location, personal settings, business rules, bank accounts, and other information. Home network server 214 may communicate with other servers on different networks (e.g., visited network 216, which may include a mobility management entity, serving gateway, packet data network gateway, etc.) to update a user account. Equipment 224 or base station 218 is coupled to home network 214 and associated server equipment 212 via visited network 216.

In at least one embodiment, the wide area network is a long term evolution (LTE) network. The LTE network maintains significant "state" information such as Packet Data Protocol (PDP) Contexts, Bearers, access point names (APNs), General Packet Radio Services (GPRS) Tunnelling Protocol (GTP) tunnels, in network equipment. Most of the "states" are used to provide seamless mobility as devices move through coverage areas of the network. An exemplary LTE network includes multiple cells, each including a base station, known as an eNodeB, to provide radio access. In addition to the radio frequency portion of the network, the LTE network includes the evolved packet core (EPC). The EPC includes a serving gateway, a mobility management entity (MME), the Home Subscriber Server (HSS), and the packet data network (PDN) gateway. The HSS provides information relating to subscribers. The PDN-gateway is coupled to a packet network, which may be, e.g., the internet. The MME provides mobility management for the network including tracking location of device 102. The serving gateway communicates with the eNodeB and acts as a local anchor for communications with the eNodeB. More than one eNodeB is typically served by the serving gateway. The PDN-gateway acts as a gateway to packet networks such as the internet. The PDN-gateway also assigns internet protocol (IP) addresses to the mobile devices and serves as an IP anchor. In at least one embodiment, the access point of the local area network couples the mobile device to the EPC network via the serving gateway and/or the PDN-gateway. When a mobile device moves to a different serving gateway, the IP packets still flow through the PDN-gateway (thus functioning as the anchor) and the same IP address is maintained using GTP-tunnel based approach to mobility management.

The PDN-gateway may acts as an anchor point and assign the internet protocol (IP) address to the mobile device for use in the IP session while the mobile device is in the cell served by the eNodeB. If the mobile device moves from coverage area to another coverage area, the IP session is handed off to the new eNodeB and the IP address assigned by the PDN gateway is maintained in the new cell to maintain session continuity.

Mobile communications device 102 also includes radio 114 that may couple mobile communications device 102 to Internet 210 via wireless local area networks using receiver 204 and access point 202 or receiver 206 and access point 208. For example, radio 114 may be configured as part of a transceiver compliant with a wireless wide area network (e.g., satellite radio communications or cellular communications) and radio 114 may be compliant with a wireless local area network (e.g., IEEE 802.11 standard-compliant communications with access points 202 or 208). Mobile communications device 102 may include additional radios compliant with other communications protocols. In addition, mobile communications device includes display subsystem 104, power supply 110, memory 108, and may include other input and output elements (e.g., a speaker, microphone, touch screen, keypad, global positioning system (GPS) receiver, sensors, etc.). In at least one embodiment, server equipment 212, which includes a remote offload controller. The remote offload controller may be an application specific circuit or firmware or software executing on server 212.

Offload controller 105 may provide a user with manual control to allow the user to offload device communications from a wide area network to a local wireless access point. If the user travels, the user has roaming as a feature associated with their mobile communications device, and the user uses the mobile communications device for substantial amounts of voice or data activity, usage charges are expensive to the service provider. Accordingly, to control charges to the service provider due to roaming contracts, the service provider may implement a technique to automatically compel the mobile communications device to connect to local wireless access points even if the user has not manually effectuated it. In some jurisdictions such control may be subject to legal restrictions. Accordingly, the user service provider network may require a user to opt-in and authorize that control as part of a service agreement or other agreement, and the service provider may provide an incentive in exchange.

In at least one embodiment, mobile communications device 102 includes offload controller 105, which may be firmware or software executing on processor 106 and/or an application-specific integrated circuit. Offload controller 105 may include either an always-on offload controller or an always enabled embedded offload control application that executes on mobile communications device 102, or offload control functionality that is part of the mobile communications device operating system that facilitates offload of communications to wireless local area networks of voice or data sessions subject to specific rules sets. Such rules and/or functionality may be initially delivered with the mobile communications device, but also may be delivered or be configurable over the air (e.g., from offload server of equipment 212). The service provider may provide the ability for a user to opt into (typically due to some incentive) having the mobile communications device automatically controlled to reduce roaming charges back to the home network service provider. In at least one embodiment of the offload control technique, if a user opted into offload control, control of the associated mobile communications device is handled in the background and may not be dynamically modified by the mobile user. The home network service provider of the mobile communications device manages those rules sets according to the service that the user has accepted as a condition for service or in exchange for an incentive. In at least one embodiment of the technique, if the user accepts an incentive offer, the home service provider configurator contacts the mobile communications device over the air and sets appropriate configuration parameters. Those configuration parameters may include one or more network communications offload profiles. In addition, each set of conditions compels the effect of one network offload profile.

Figure 4:
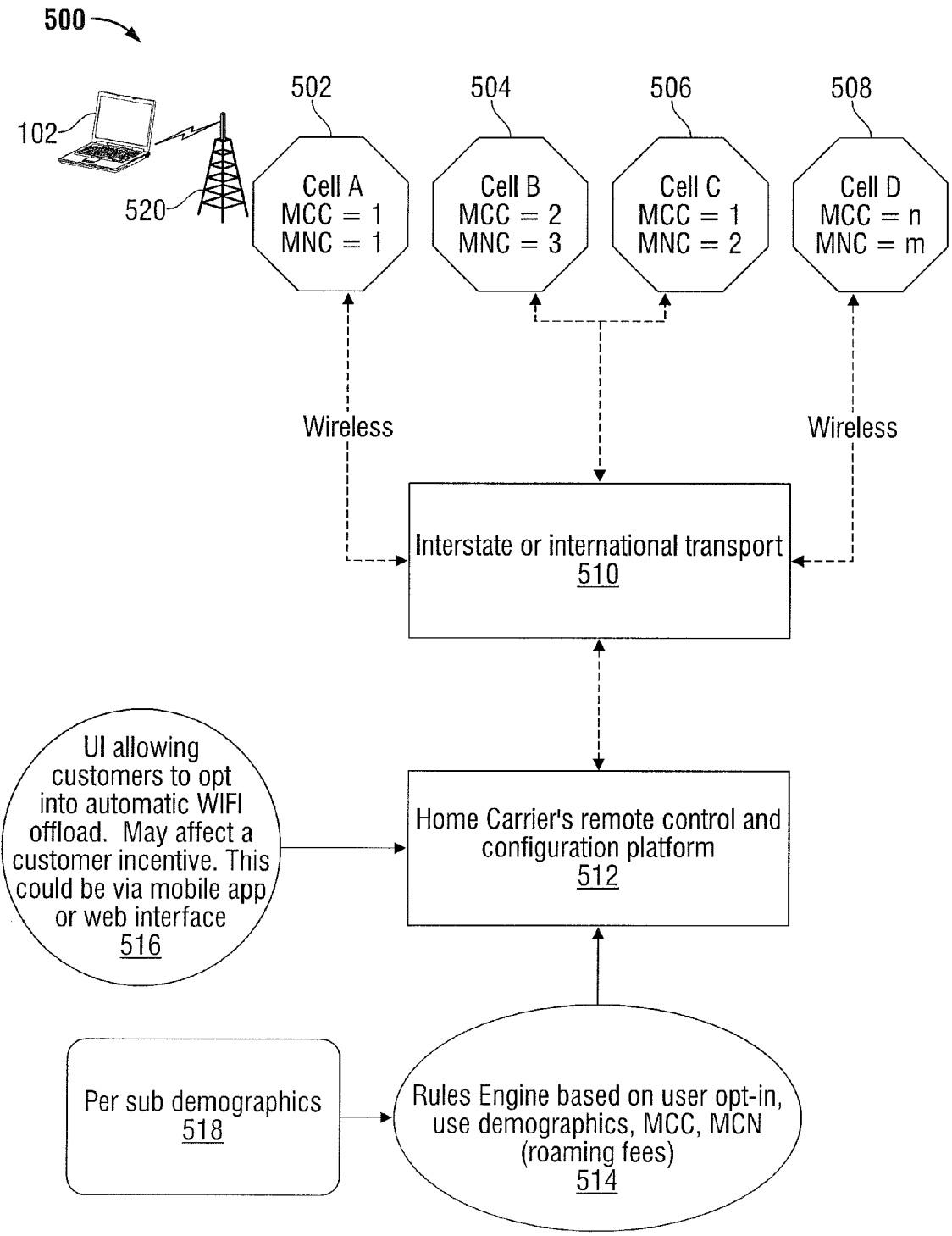
FIG. 4 illustrates an exemplary functional block diagram of a mobile communications system configured consistent with traffic offloading techniques, consistent with at least one embodiment of the disclosure.

For example, referring to FIG. 3, mobile communications device 102 includes a plurality of communications offload profiles e.g., RULES PROFILE1, RULES PROFILE2, . . . , RULES PROFILEp, stored in memory 108. Each of the plurality of communications offload profiles may be accessed by a region identifier (e.g., a Mobile Country Code (MCC) or a Mobile Network Code (MNC) that are part of the International Mobile Subscriber Identity or Local Area Identity, or a combination thereof). Referring to FIG. 4, mobile communications device 102 receives a region identifier from network 510 in response to an attempt to register with the network in a particular cell of an associated region. Mobile communications device 102 accesses a rules profile that is stored in memory 108 and corresponds to the particular region identifier received from the network 510. The rules profile provides constraints for offloading communications of the mobile communications device from the wide area network to a local wireless network. Exemplary constraints include time of day constraints, performance constraints (e.g., quality of service, throughput, latency, signal strength, session quality, and radio interface failures), and access point identifier constraints.

An exemplary rules profile of stored in memory 108 may specify always attempting to connect to a wireless access point if the wireless access point has a signal strength above a first threshold, that the signal strength above the first threshold is observed continuously for more than a predetermined amount of time, and a test of throughput or quality meets or exceeds a predetermined Quality of Service (QoS) threshold. A rules profile may also require that if the mobile country code (MCC) where the device is registered indicates that the device is registered in a first region (e.g., China), then use of a particular offloading profile is used. If the device is registered in a second region (e.g., Singapore), then a different offload profile is used. Those profiles may reflect the cost of out-collect with different mobile service providers in different regions, regional laws, regional taxes, performance of wireless local area networks in different regions, or performance of the particular mobile communications device type on a particular network. A rules profile may have varying complexity and may include temporal constraints, e.g., requiring offloading to another network between the times of $t_1$ and $t_2$, but requiring no offloading between times $t_3$ and $t_4$. The rules profile may specify constraints based on one or more access point network identifier, e.g., a Media Access Control (MAC) address or Service Set Identifier (SSID) specific constraints. For example, if the MAC or SSID address includes bits indicating a particular type of access point (e.g. a government entity), the offload controller will not facilitate the mobile communications device to connect to that access point, but may facilitate connection to access points having MAC addresses or SSIDs indicative of free or public (e.g., non-secured) access points.

In at least one embodiment of the offload technique, the rules profile may be modified dynamically according to how aggressively the service provider network needs to offload mobile traffic from the wide area network based upon cost of out-collect charges on any specific network, in a particular region of the world. In addition, a rules profile may include or be updated to include demographics constraints. For example, those users that are less tolerant of communications offloading will receive profiles that are less likely to, or never, require offload. The user demographics constraints may be based on user communications with customer care regarding user experience resulting from prior changes in service due to offloading. The demographics information may indicate how sensitive a user is to the price versus performance, for voice and data independently and corresponding offloading parameters may be based thereon. For example, sales professionals may be tolerant of a slowdown in file transfers, but have high expectations on sales telephone call quality, while other users may demand better data performance for gaming, but seldom make a telephone call. The offloading technique may provide refined control to adjust the customer experience, while reducing out-collect charges to the home network. The offloading technique may also provide additional functionality such as reporting location, performance, throughput, latency, signal strength, session quality, and radio interface failures from any network in any region of the world.

Referring to FIG. 4, mobile communications device 102 may visit service areas (e.g., cells) in various different regions, each having a unique region identifier. For example, region 502, region 504, region 506, and region 508 are associated with different combinations of MCC and MNC (e.g., in cell A, MCC=1, MNC=1, in cell B, MCC=2, MNC=3, in cell C, MCC=1, MNC=2, and in cell D, MCC=n, MNC=m, respectively). In each of those regions, the mobile communications device 102 is coupled to a visited network. In at least one embodiment, the rules profiles are configurable over the air from the home service provider to the mobile communications device. In at least one embodiment of the offloading technique, a mobile application or web interface 516 includes a user interface that allows the user to opt into automatic traffic offload control. A user is able to revoke permission to automatically offload communications from their device and the home service provider would disable such functionality or portions thereof in response. However, remote communication capability may be retained in the event the user decides to reinstate such capability. A home service provider remote control and configuration platform 512 may send configuration data to mobile communications device 102 using interstate or international transport network 510. The configuration data may include rule profiles generated by rules engine 514 based on the user election, use demographics provided by collection 518, region identifier, roaming fees, etc.

Figure 5:
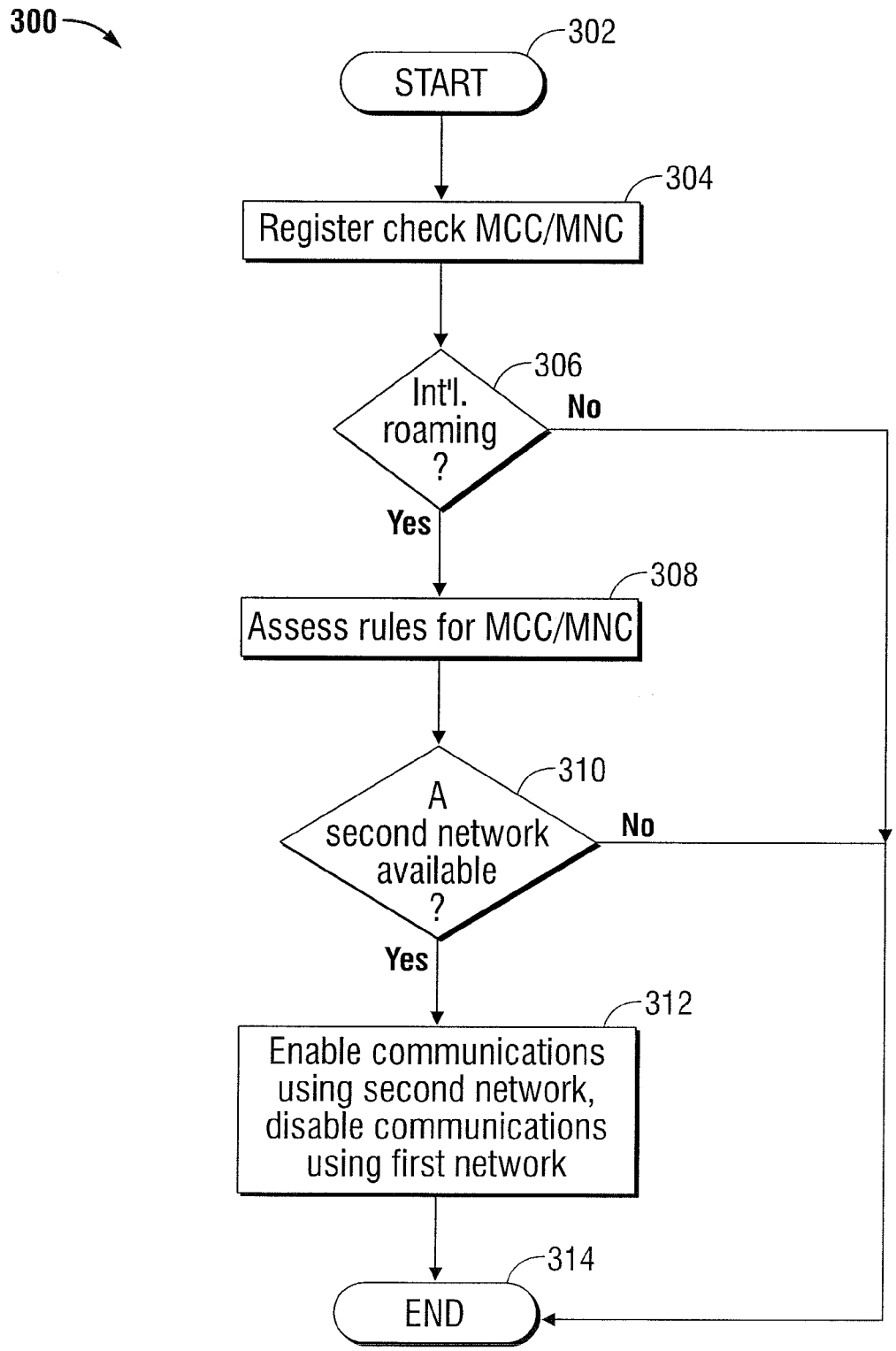
FIG. 5 illustrates an exemplary information and control flow of the mobile communications system of FIG. 4, configured with involuntary traffic offloading techniques consistent with at least one embodiment of the disclosure.

Referring to FIG. 5, upon power up prior to establishing a communications session or upon other registration event during a communications session (302), mobile communications device 102 initiates registration with the wide area network (e.g., cellular service) and receives a region identifier from a base station in response. The offload controller of mobile communications device 102 determines whether the mobile communications device is internationally roaming based on the region identifier(s) (306). If mobile communications device 102 is roaming on a visited network, the offload controller 105 assesses a rules profile corresponding to the region identifier(s) (308). Based on the rules profile, offload controller determines whether a second network is available for offloading communications from the first network (310). The determination includes searching for available wireless access points and applying the rules profile to those access points to determine whether any suitable wireless access point is available for communications offloading. If no second network is available, offloading does not occur and the mobile communications device continues communications with the first wireless network using any suitable handshaking techniques (e.g., Transmission Control Protocol of the Internet Protocol Suite (TCP/IP)). However, if a second network is available then the offloading application enables communications with the second network using a second radio and disables communications with the first network using the first radio (312). If multiple wireless local area networks are available, offload controller 105 may distribute the traffic load across multiple networks, where possible, or selects a wireless local area network using any suitable technique (e.g., based on proximity, network performance, signal strength, available bandwidth, etc.).

Figure 6:
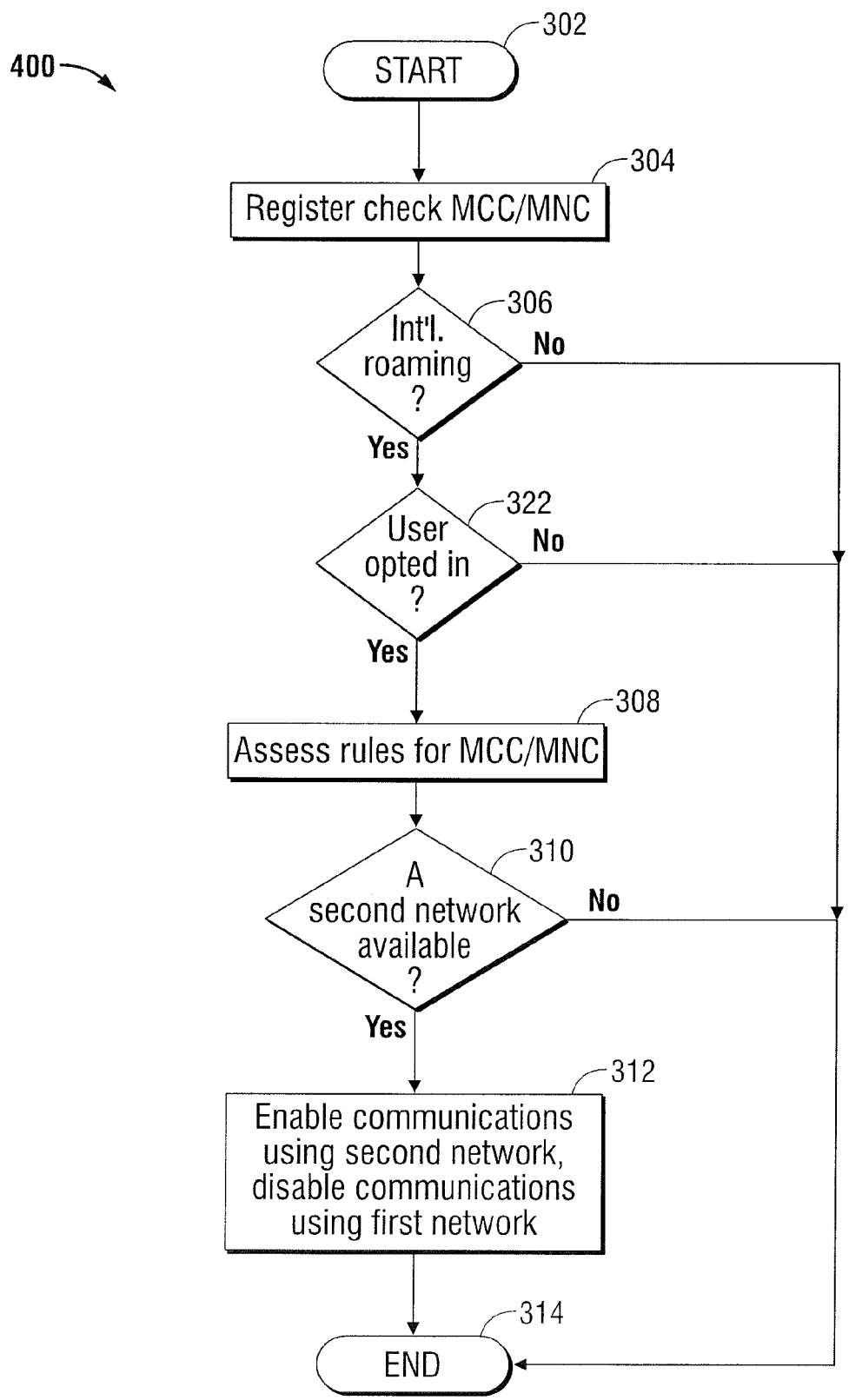
FIG. 6 illustrates an exemplary information and control flow of the mobile communications system of FIG. 4, configured with user-selectable traffic offloading techniques consistent with at least one embodiment of the disclosure.

Referring to FIG. 6, in at least one embodiment, the user may be allowed to opt into the offloading technique and may later revoke that authorization. Offload controller of FIG. 6 executes similar to the offload controller of FIG. 5, except the offload controller of FIG. 6 verifies whether or not the user opted in (322). If the user did not authorize communications offloading, then mobile communications device 102 communicates using the first communications network and the first radio of mobile communications device 102. When the user has opted in, then the offload controller assesses a rules profile corresponding to the region identifier(s) (308). Based on the rules profile, the mobile communications device determines whether a second network is available for offloading communications from the first network (310). The determination includes searching for available wireless access points and applying the rules profile to those access points to determine whether any suitable wireless access point is available for communications offloading. If no second network is available, offloading does not occur and the mobile communications device continues communications with the first wireless network. However, if a second network is available then the offloading application enables communications with the second network using a second radio and disables communications with the first network using the first radio (312). In addition if mobile communications device 102 moves out of range of the access point or the performance of the access point falls below a threshold, the offload controller may divert communications from the second network onto the first network or determine whether another network is available to offload communications from the first network.

Structures described herein may be implemented using software executing on a processor (which includes firmware) or by a combination of software and hardware. Software, as described herein, may be encoded in at least one non-transitory computer readable medium. As referred to herein, a non-transitory computer-readable medium includes at least a disk, tape, or other magnetic, optical, or electronic storage medium.

The description of the invention set forth herein is illustrative, and is not intended to limit the scope of the invention as set forth in the following claims. For example, while the invention has been described in an embodiment in which mobile country code and mobile network codes are used to identify a region, one of skill in the art will appreciate that the teachings herein can be utilized with other region identifiers consistent with other protocols. Variations and modifications of the embodiments disclosed herein, may be made based on the description set forth herein, without departing from the scope and spirit of the invention as set forth in the following claims.

What is claimed is:
1. A method of managing network resource usage of a mobile communications device comprising:
    initiating registration of the mobile communications device with a wireless wide area communications network;

receiving a region indicator from the wireless wide area communications network in response to the initiating; and selectively communicating by the mobile communications device with a wireless local area communications network according to a rules profile associated with the region indicator, the selectively communicating including offloading communications by the mobile communications device from the wireless wide area communications network to the wireless local area communications network in response to a country code or a network code of the region indicator being different from a country code or a network code of a service provider associated with the mobile communications device.

2. The method, as recited in claim 1, wherein the rules profile is one of a plurality of rules profiles identified based on the region indicator.

3. The method, as recited in claim 1, wherein the offloading is further in response to at least one of time of day constraints, access point identifier constraints, and performance threshold constraints of the rules profile.

4. The method, as recited in claim 2, further comprising: updating the plurality of rules profiles using the wide area communications network by a home network service provider associated with the mobile communications device.

5. The method, as recited in claim 4, wherein the plurality of rules profiles are based on user demographic information.

6. The method, as recited in claim 1, wherein the selectively communicating is not controllable by a user of the mobile communications device.

7. The method, as recited in claim 1, further comprising: reporting at least one of location and performance information of the wireless local area communications network to a home network service provider associated with the mobile communications device.

8. The method, as recited in claim 1, wherein the rules profile is generated based on user offloading tolerance information.

9. The method, as recited in claim 1, wherein the rules profile is generated based on user price versus performance sensitivity information.

10. An apparatus comprising:
a mobile communications device comprising:
a first radio configured to communicate with a wireless wide area communications network;
a second radio for communicating with a wireless local area communications network; and
a controller configured to select one of the first radio and the second radio for wireless communications of the mobile communications device based on a rules profile associated with a region indicator received by the mobile communications device from the wireless wide area communications network, the controller being configured to offload communications by the mobile communications device from the wireless wide area communications network to the wireless local area communications network in response to a country code or a network code of the region indicator being different from a country code or a network code of a service provider associated with the mobile communications device.

11. The apparatus, as recited in claim 10, wherein the mobile communications device further comprises a storage circuit configured to store the rules profile as one of a plurality of rules profiles accessible based on the region indicator.

12. The apparatus, as recited in claim 11, wherein the offload is further in response to at least one of time of day constraints, access point identifier constraints, and performance threshold constraints of the rules profile.

13. The apparatus, as recited in claim 11, wherein the mobile communications device is configured to update the plurality of rules profiles in response to information received using the wireless wide area communications network from a home network service provider associated with the mobile communications device.

14. The apparatus, as recited in claim 11, wherein the plurality of rules profiles are based on user demographic information.

15. The apparatus, as recited in claim 10, further comprising:
a rules engine configured to provide the rules profile to the mobile communications device.

16. The apparatus, as recited in claim 10, wherein the rules profile is generated based on user offloading tolerance information.

17. The apparatus, as recited in claim 10, wherein the rules profile is generated based on user price versus performance sensitivity information.

18. An apparatus comprising:
means for communicating with a wireless wide area communications network and for receiving a region indicator from the wireless wide area communications network in response thereto; and
means for communicating with a wireless local area communications network; and
means for selecting one of the means for communicating with the wireless wide area communications network and the means for communicating with the wireless local area communications network based on a rules profile associated with a region indicator received using the means for communicating with the wireless wide area communications network, the selecting including offloading communications by the apparatus from the wireless wide area communications network to the wireless local area communications network in response to a country code or a network code of the region indicator being different from a country code or a network code of a service provider associated with the apparatus.

* * * * *